US008754786B2

(12) United States Patent
Burns et al.

(10) Patent No.: US 8,754,786 B2
(45) Date of Patent: Jun. 17, 2014

(54) METHOD OF OPERATING A SYNTHETIC VISION SYSTEM IN AN AIRCRAFT

(75) Inventors: Timothy Donal Paul Burns, Richmond Hill, GA (US); Dashiell Matthews Kolbe, Grand Rapids, MI (US); Norman Leonard Ovens, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 13/174,246

(22) Filed: Jun. 30, 2011

(65) Prior Publication Data

US 2013/0002454 A1    Jan. 3, 2013

(51) Int. Cl.
*G01C 21/00*    (2006.01)

(52) U.S. Cl.
USPC .................. 340/971; 340/980; 701/14; 345/7

(58) Field of Classification Search
USPC .......................... 340/971, 980; 701/14; 345/7
See application file for complete search history.

(56) References Cited

U.S. PATENT DOCUMENTS

| 3,892,051 | A | 7/1975 | Bunker |
| 2006/0066459 | A1* | 3/2006 | Burch et al. .................. 340/980 |
| 2006/0119576 | A1 | 6/2006 | Richardson |
| 2008/0195309 | A1* | 8/2008 | Prinzel, III et al. ........... 701/208 |
| 2011/0187563 | A1* | 8/2011 | Sanders-Reed ............... 340/971 |

FOREIGN PATENT DOCUMENTS

| DE | 4207284 A1 | 9/1993 |
| EP | 1840861 A2 | 10/2007 |

OTHER PUBLICATIONS

Search Report and Written Opinion from corresponding EP Application No. 12173943.7-1236 dated Oct. 5, 2012.

* cited by examiner

*Primary Examiner* — Steven Lim
*Assistant Examiner* — Hongmin Fan
(74) *Attorney, Agent, or Firm* — McGarry Bair

(57) ABSTRACT

A method of operating an aircraft comprising a cockpit with a flight deck having at least one flight display, a pilot's seat facing the flight deck, and a synthetic vision system producing a synthetic image for displaying on the at least one flight display.

10 Claims, 3 Drawing Sheets

METHOD OF OPERATING A SYNTHETIC VISION SYSTEM IN AN AIRCRAFT

BACKGROUND OF THE INVENTION

A contemporary aircraft may include the use of a synthetic vision system, which may present the crew with a display showing a computer generated representation of the world in front of the aircraft. Such a synthetic vision system improves the ability of a flight crew to orient themselves with respect to geographical terrain and obstacles and provides them with images corresponding to what they would actually see out of the windshield of the cockpit under clear visibility conditions. Such a system may be particularly useful when visibility is poor outside the aircraft. Current synthetic vision systems are limited to providing the crew with a forward looking view.

BRIEF DESCRIPTION OF THE INVENTION

In one embodiment, a method of operating an aircraft having a cockpit with a flight deck having at least one flight display, a pilot's seat facing the flight deck, and a synthetic vision system producing a synthetic image for displaying on the at least one flight display includes determining the aircraft's location and heading, retrieving a synthetic vision image from the synthetic vision system according to the determined location and heading, displaying on the at least one flight display the synthetic vision image, receiving a viewing change input from the pilot requesting a change in the heading for the synthetic vision image being displayed, in response to the viewing change input, tracking the movement of the pilot's head for the pilot sitting in the seat, determining an updated heading based on the tracked head movement, retrieving an updated synthetic vision image from the synthetic vision system according to the updated heading, and displaying on the at least one flight display the updated synthetic vision image.

DESCRIPTION OF EMBODIMENTS OF THE INVENTION

Figure 1:
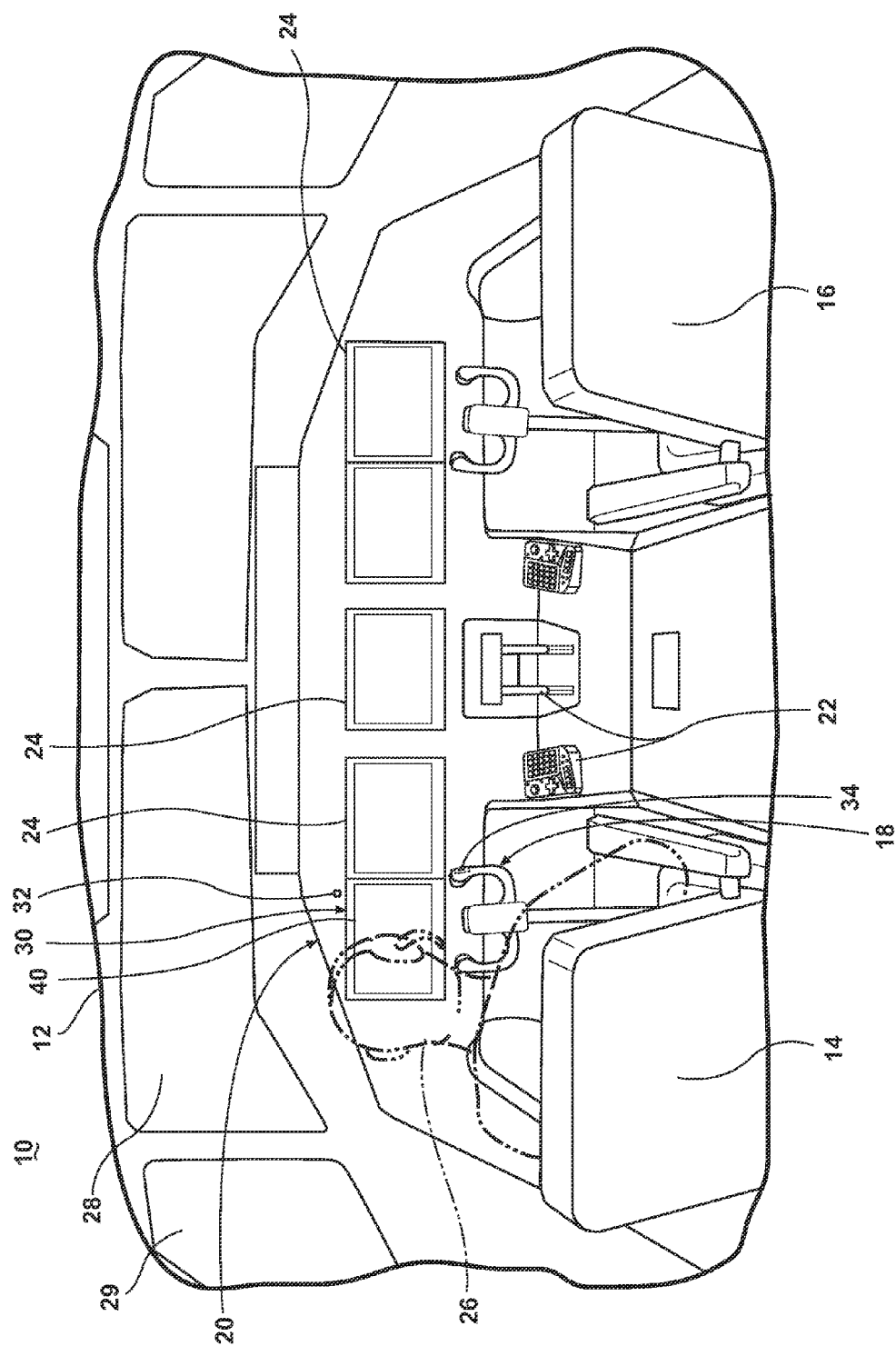
FIG. 1 is a perspective view of a portion of an aircraft cockpit having a synthetic vision system according to a first embodiment of the invention.

FIG. 1 illustrates a portion of an aircraft 10 having a cockpit 12 with a pilot seat 14, a co-pilot seat 16, an aircraft control yoke 18, and a flight deck 20 having a number of flight controls 22 and multiple flight displays 24. The multiple flight displays 24 may include primary and secondary flight displays any of which may be used to display to the pilot and flight crew a wide range of aircraft, flight, navigation, and other information used in the operation and control of the aircraft. While a commercial aircraft has been illustrated it is contemplated that the invention may be used in any type of aircraft, for example, without limitation, fixed-wing, rotating-wing, rocket, personal aircraft, and military aircraft.

A pilot 26, sitting in the pilot seat 14 facing the flight deck 20, may utilize the yoke 18 as well as the other flight controls 22 to maneuver the aircraft 10. It is contemplated that a control stick or other control device may alternatively be installed in the cockpit 12 instead of the yoke 18 and that such a control stick may be used to maneuver the aircraft 10. For purposes of this description, the term "yoke" is used to refer to all types of control devices. The pilot 26 may visually monitor the flight path of the aircraft 10 through a windshield 28 and/or windows 29. However, if the pilot 26 relies on sight through windshield 28 and windows 29, his or her visual range may be limited. The pilot and other members of the flight crew may use the multiple flight displays 24 to increase their visual range and to enhance their decision-making abilities. In an exemplary embodiment, flight displays 24 may be configured to show weather, terrain, fixed obstacles (e.g., towers and buildings), variable obstacles (e.g., other aircraft), flight characteristics (e.g., altitude or speed), or any combination thereof.

A synthetic vision system 30 may be included in the aircraft 10 and may produce a synthetic image of the world around the aircraft 10 for display on one of the flight displays 24. The synthetic vision system 30 is a computer based reality system that uses 3D to provide pilots with clear and intuitive means of understanding their flying environment. The synthetic vision system 30 uses the 3D imaging to improve the situational awareness of the pilot 26 by providing the pilot with realistic imaging of the world outside the aircraft, which is created from information and imagery from various databases.

A sensor 32 and an actuator 34 may also be located within the cockpit 12 and may be included as a portion of the synthetic vision system 30 and will be described herein in detail. It is sufficient at this point to explain that the sensor 32 may be positioned such that the pilot 26 sitting in the pilot seat 14 is within the view of the sensor 32 and that while the actuator 34 has been illustrated as being located on the yoke 18 it may alternatively be located elsewhere on the flight deck 20 within reach of the pilot 26.

Figure 2:
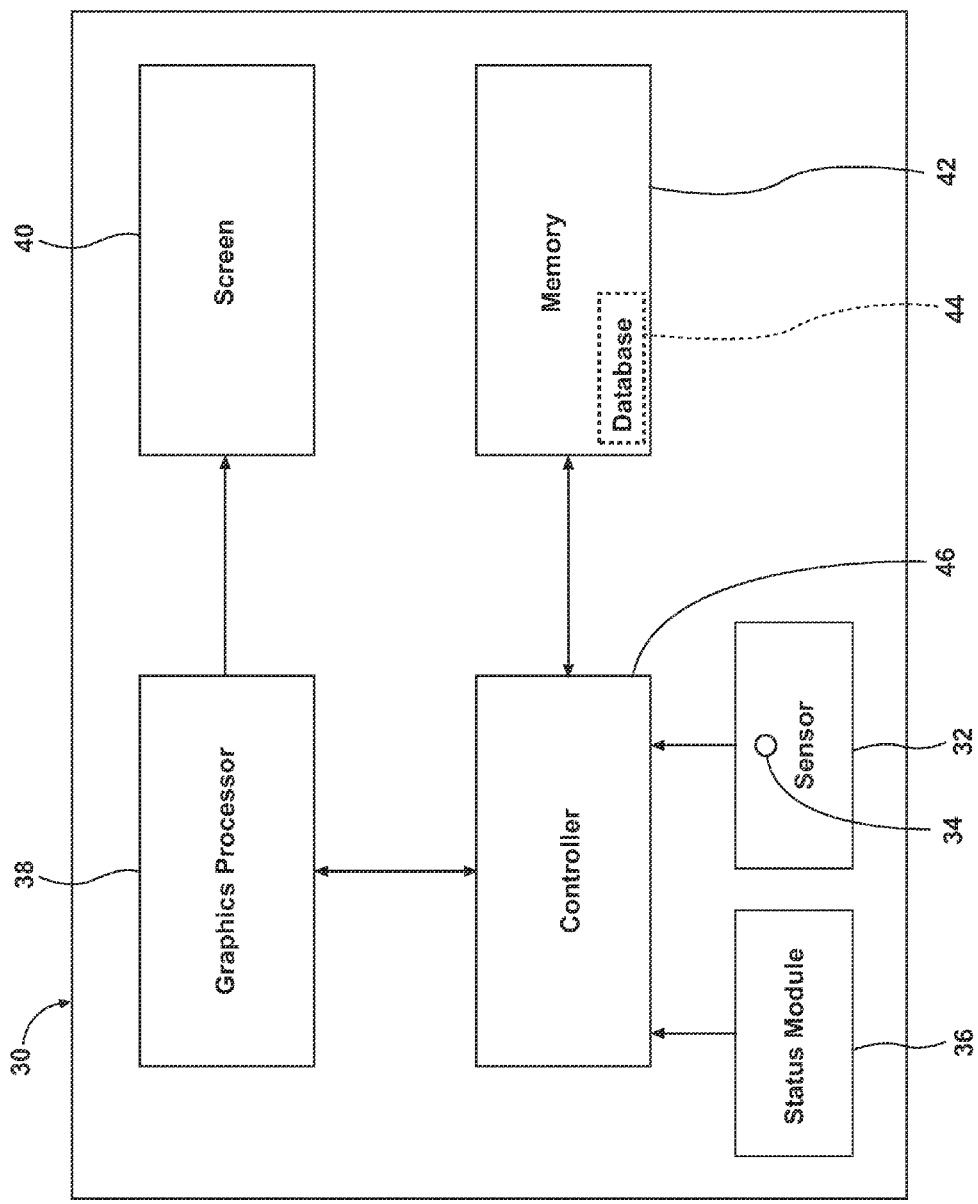
FIG. 2 is a schematic view of a synthetic vision system for use in the aircraft of FIG. 1.

FIG. 2 schematically illustrates the synthetic vision system 30 as including an aircraft status module 36, a graphics processor 38, a screen 40, a memory 42, a database 44, the sensor 32, the actuator 34, and a controller 46. The aircraft status module 36 may provide status data about the aircraft 10. Such status data may include, by way of non-limiting examples, geo-position, altitude, heading, velocity, and acceleration. The status module 36 may include a Global Positioning System (GPS), which may provide coordinate data about the geo-position of the aircraft 10. The GPS portion may also provide the status module 36 with data regarding the altitude of the aircraft 10 as well as the heading and speed of the aircraft 10. The status module 36 may also include data received from an inertial reference system of the aircraft 10, which may provide position and heading input as well as velocity and acceleration input.

The graphics processor 38 may be any suitable graphics processor capable of generating images on screen 40 in response to instructions and information received from controller 46. While the graphics processor 38 is depicted as being a physically separate entity from controller 46, it is contemplated that the graphics processor 38 could be considered a component of controller 46 wherein the controller 46 could manipulate the images displayed on screen 40 without the utilization of a separate graphics processor.

Screen 40 may be any suitable display screen such as a liquid crystal display (LCD) screen, a plasma screen, or any other type of screen on which graphic images may be displayed. The screen 40 has been illustrated as being one of the displays of the multiple flight displays 24. It is alternatively contemplated that the screen 40 may be a separate display screen.

The memory 42 may include random access memory (RAM), read-only memory (ROM), flash memory, or one or more different types of portable electronic memory, such as discs, DVDs, CD-ROMs, etc., or any suitable combination of these types of memory. As illustrated, the database 44 may be included in the memory 42 and may store imagery data that may include geo-specific terrain, man-made objects including runway and airport layouts, and additional imagery including aircraft traffic information. It is contemplated that the database 44 may incorporate a number of databases or that the database 44 may actually be a number of separate databases including a terrain data base, man-made obstacle database, geo-political database, hydrological database, and other databases. It is contemplated that the synthetic vision system 30 retrieves and displays the synthetic vision image by generating the synthetic vision image from the information and imagery data obtained from the multiple databases.

Alternatively, it is contemplated that the database 44 may be separate from the memory 42 but may be in communication with either the memory 42 and/or the controller 46 such that it may be accessed by either the memory 42 and/or the controller 46. For example, it is contemplated that the database 44 may be contained on a portable memory device and in such a case, the synthetic vision system 30 may include a port for receiving the portable memory device and such a port would be in electronic communication with controller 46 such that controller 46 may be able to read the contents of the portable memory device. It is also contemplated that the database 44 may be updated through a communication link and that in this manner real time information such as information regarding air traffic imagery may be included in the database 44 and may be included in the synthetic vision image displayed by the synthetic vision system 30.

The sensor 32 may be any suitable sensor capable of detecting movement of one or more sensed objects, including by way of non-limiting example the head of the pilot 26, and outputting a signal regarding the tracked movement. The sensor 32 may be capable of detecting the movement of the pilot's head relative to a reference location or relative to a start position of the object. By way of non-limiting example the sensor 32 may include a camera, which may be mounted on the flight deck 20 in a fixed location, may have a field of view that encompasses the pilot seat 14, and may output a signal indicative of movement of the pilot's head. Exemplary cameras include a CCD camera, a CMOS camera, a digital camera, a video camera, an infrared camera, or any other type of device capable of tracking movement of the pilot's head. It should be appreciated that the use of a camera is exemplary only and that other types of movement sensors may be employed. By way of additional non-limiting example, a non-optical motion/position sensor, such as an accelerometer, may be employed. Regardless of the type of sensor 32 used, it is contemplated that the sensor 32 may detect movement of the pilot's head in multiple directions including detecting horizontal movement and vertical movement and may output a signal regarding such movement to the controller 46. It is contemplated that a mechanism may be operably coupled to the sensor 32, which may allow the pilot to limit the detection of the sensor to either horizontal movement or vertical movement. In this manner the pilot may have the ability to disable one or the other detection directions such that only lateral movement or horizontal movement is detected.

The actuator 34 may be operably coupled with the synthetic vision system 30 such that when the pilot activates the actuator 34 the synthetic vision system 30 receives an input that the pilot 26 is requesting a change in the heading for the synthetic vision image being displayed. As illustrated, the actuator 34 may be easily accessible by a user, such as the pilot 26, such that the pilot 26 may selectively input a request for a viewing change through operation of the actuator 34. By way of non-limiting example, the actuator 34 has been illustrated as a switch on the yoke 18; however, it is contemplated that the actuator 34 may be any suitable mechanism capable of inputting a request for a viewing change and may be located in any location where it is accessible by the pilot 26.

Controller 46 may include one or more microprocessors or suitable electronic components capable of carrying out the functions necessary to operate the synthetic vision system 30. The controller 46 may be in electronic communication with the sensor 32 and may receive the signal output by the sensor 32, which is indicative of movement of the sensed object. It is contemplated that the controller 46 may include an image processor to enable tracking of the movement of the pilot's head. More specifically, the image processor of the control 46 may take the output from the sensor 32 and track the amount of movement of the pilot's head from the output signal. Alternatively, it is contemplated that the sensor 32 may include such imaging software or capabilities for tracking the moment of the pilot's head 26 and that the signal output from the sensor 32 may indicate the tracked movement.

The controller 46 may be in electronic communication with the memory 42 such that the controller 46 may read the data contained within memory 42 as well as write data to the memory 42, if desired. The controller 46 may also be in communication with graphics processor 38 which, in turn, is in communication with screen 40. The controller 46 may, therefore, be able to dictate the images that are displayed on the screen 40 through instructions and information issued from controller 46 to the graphics processor 38. The instructions from controller 46 to the graphics processor 38 regarding images to be displayed on the screen 40 may be based upon information contained within memory 42 and the database 44.

The above described synthetic vision system 30 may be used to effect control over rendered scenes or other images displayed on the screen 40 to aid the flight crew in operation of the aircraft 10. During operation of the synthetic vision system 30, the controller 46 may receive data from the aircraft status module 36 from which the controller 46 may determine information regarding the location, heading, and velocity of the aircraft 10. By way of non-limiting example, the aircraft's location may be determined from coordinates from the GPS and the aircraft's heading may be determined by receiving a heading input from an inertial guidance system. The controller 46 may access the memory 42 and may match the aircraft's location and heading data with proper imagery data from the database 44 and may provide such information to the graphics processor 38. The graphics processor 38 may then output the correct imagery to the screen 40.

Figure 3A:
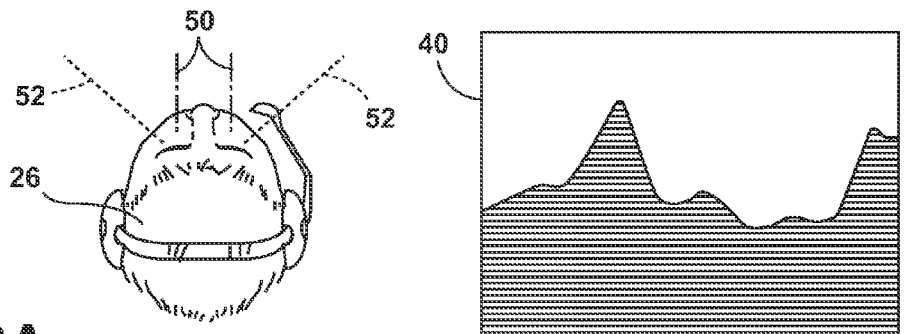
FIG. 3A illustrates a user in a straight ahead position and a schematic view of a display of a forward looking synthetic vision image.

Essentially, the synthetic vision system 30 retrieves a synthetic vision image according to the determined location and heading of the aircraft 10 and displays on the screen 40 the synthetic vision image. Such a view may be in either 2D or 3D and may be repeatedly updated multiple times a second in order to account for the movement of the aircraft 10. Thus, the synthetic vision image may be continually updated in order to provide images that generally match the actual views that a pilot would see looking out the front windshield 28 of the aircraft 10 as the aircraft 10 moves. Such a forward looking synthetic view and forward looking pilot are illustrated in FIG. 3A.

The synthetic vision system 30 may also be used to obtain views which are not straight ahead of the aircraft 10. While displaying the straight-ahead synthetic vision image, the synthetic vision system 30 may receive a viewing change input from the pilot 26 requesting a change in the heading for the synthetic vision image being displayed. Such an input may be received when the pilot 26 activates the actuator 34. Such a viewing change input from the actuator 34 results in the synthetic vision system 30 tracking the movement of the pilot's head while the pilot 26 sits in the pilot's seat 14. More specifically, the sensor 32 may output to the controller 46 a signal indicative of the movement of the pilot's head and the controller 46 may track the movement of the pilot's head from the output signal. Alternatively, the sensor 32 may output a signal indicative of the tracked movement of the pilot's head to the controller 46.

Figure 3B:
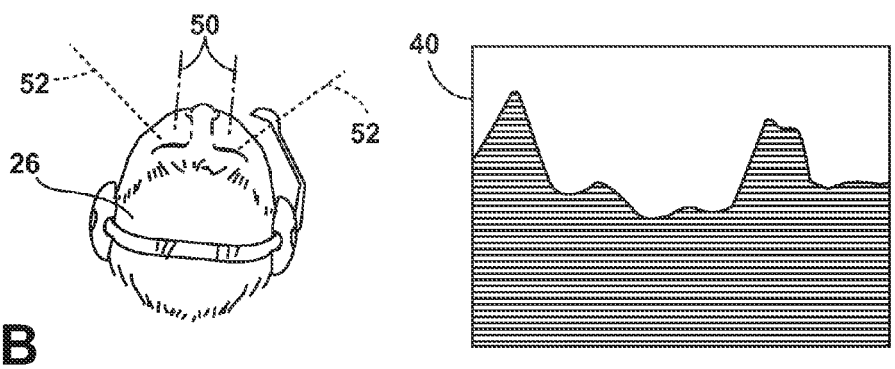
FIGS. 3B-3D illustrate examples of a user interacting with the synthetic vision system to display updated synthetic vision images according to embodiments of the invention.

Regardless of the way the movement is tracked, the controller 46 may then determine an updated heading based on the tracked head movement of the pilot's head. The controller 46 takes this updated heading and retrieves information and imagery from the database 44 related to the updated heading and sends such information to the graphics processor 38. The graphics processor 38 then sends an updated synthetic vision image to the screen 40 that is based on the updated heading. This allows the pilot 26 to change the heading for the synthetic vision image displayed on the screen 40 by moving his head by a certain degree. For example, if the pilot 26 would like the screen 40 to show what is right of his current view he may select the actuator 34 and turn his head to the right and the synthetic vision system 30 will work to display on the screen 40 an updated synthetic vision image of the world to the right of what was previously shown. For example, as illustrated in FIG. 3B, when the pilot's head moves 5 degrees to the right, the lines 50 have been included in the figure to better illustrate the movement of the pilot's head, the synthetic image displayed may have an updated heading that is also 5 degrees to the right of the previously forward looking display. In this manner, the synthetic vision system 30 displays on the screen 40 updated synthetic vision images of the terrain, landmarks, and air traffic in a direction that is determined based upon the movement of the pilot's head. Such a view may be repetitively updated multiple times a second in order to account for the movement of the aircraft 10 and additional movement of the pilot's head as determined by the synthetic vision system 30. Upon release of the actuator 34 the image returns to the straight-ahead view.

It is contemplated that tracking the movement of the pilot's head may include tracking side-to-side head movement as well as tracking up and down head movement to determine a pitch. It will be understood that in the case where the pilot's head moves side to side an updated heading relative to such sideways movement is determined by the controller 46 and updated synthetic vision images are retrieved according to the updated heading. In the case where the pilot's head movement also includes up or down movement, a pitch based on the tracked up or down head movement is determined, and the updated synthetic vision images are retrieved according to both the updated heading and the determined pitch, which allows the pilot 26 the ability to more fully direct the synthetic vision system 30 to graphically display the terrain, obstacles, and air traffic.

It is contemplated that in determining the updated heading, the synthetic vision system 30 may scale the tracked head movement of the pilot 26. Such scaling by the synthetic vision system 30 may include converting a range of rotation corresponding to the pilot's head from a straight ahead position to a position where the pilot's eyes will remain fixed on the at least one flight display to a change in the updated heading of 180 degrees. Thus, through the use of such scaling the pilot's head may be rotated, by way of non-limiting example, less than 40 degrees, such that he may maintain eye contact with the screen 40, and the resulting display will have a heading change of at least 180 degrees, such that he may synthetically see behind the aircraft 10. Such scaling allows the pilot 26 to have a full view of the area around the aircraft 10 by simply moving his head left, right, up, and down by a certain degree while still allowing the pilot's eyes to be fixed on his primary flight display such that he does not lose visual contact with the display as his field of view 52 would still include the screen 40, which is ahead of him.

Figure 3C:
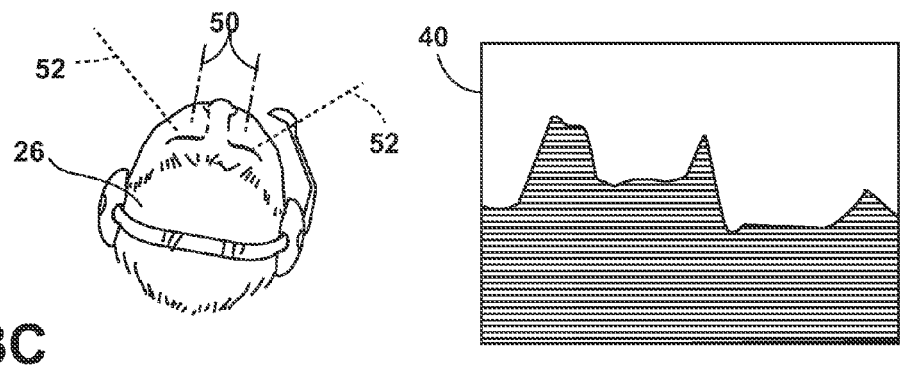
Figure 3D:
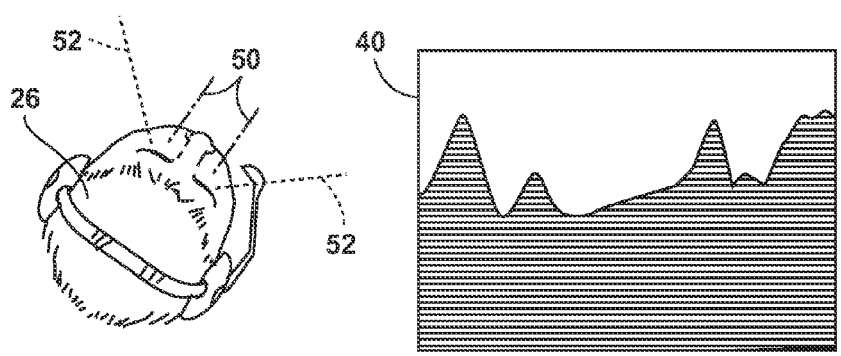

It is further contemplated that the scaling may be non-linear. By way of non-limiting example, the non-linear scaling may include an increase in the amount of scaling as the rotation of the pilot's head increases. More specifically, as the pilot's head moves further away from a straight ahead position the amount of scaling increases. For example, FIG. 3C illustrates that the pilot's head has moved 10 degrees from a straight ahead position while the updated heading has been moved 50 degrees from the forward looking position. In FIG. 3D it is illustrated that the pilot's head has moved 35 degrees from a straight ahead position while the updated heading has been moved 180 degrees from the forward looking position. In this manner, the head motion of the pilot is scaled by the synthetic vision system to increase the pilot's apparent range of motion and still enables the pilot to maintain sight of the displays on the flight deck 20.

While the above description illustrates the use of the synthetic vision system 30 during flight of the aircraft, it is also contemplated that the synthetic vision system 30 may be employed while the aircraft 10 is on the ground. In such an instance, it is contemplated that retrieving a synthetic vision image or updated synthetic vision image may include receiving data regarding the location of gates and other aircrafts around the aircraft 10. This may aid the flight crew in locating where the aircraft is on the airport surface and help the flight crew identify the location of other aircrafts that are not directly ahead of the aircraft 10. Further, while the above described embodiment is related to input from the pilot 26 and tracking movement of the pilot's head it will be understood that the synthetic vision system 30 could easily receive input from alternative flight crew members and the movement of those members could be tracked to determine an updated heading. For example, it is contemplated that a separate screen, sensor, and actuator may be included for use by the co-pilot and that such elements may be tied with the synthetic vision system such that the controller may determine an updated heading with respect to the movement of the co-pilot's head.

The above described synthetic vision system is not limited to being forward looking only and uses the motion of the pilot's head to control the display on the synthetic vision system 30. The synthetic vision system and above described methods allow the pilot to easily adjust his synthetic view by activating an actuator such that the synthetic vision is updated based upon the detected movement of the pilot's head, instead of limiting the pilot to a forward-only view. As the pilot rotates his head he is able to get an improved situational awareness of terrain, obstacles, and traffic around the aircraft and then upon release of the actuator the synthetic vision may return to a synthetic vision image representing the straight ahead view. The above described embodiment and method allow for improved situational awareness of the pilot by allowing him or her more freedom to look around outside the aircraft and allows the pilot to form a mental model of the environment around the entirety of aircraft while still keeping the primary flight displays in view.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating an aircraft comprising a cockpit with a flight deck having at least one flight display, a pilot's seat facing the flight deck, and a synthetic vision system producing a synthetic image for displaying on the at least one flight display, the method comprising:
   determining a location and heading of the aircraft;
   retrieving a synthetic vision image from the synthetic vision system according to the determined location and heading;
   displaying on the at least one flight display the synthetic vision image;
   receiving a viewing change input from the pilot requesting a change in the heading for the synthetic vision image being displayed;
   in response to the viewing change input, tracking movement of the pilot's head for the pilot sitting in the seat;
   determining an updated heading based on the tracked head movement including scaling the tracked head movement;
   retrieving an updated synthetic vision image from the synthetic vision system according to the updated heading; and
   displaying on the at least one flight display the updated synthetic vision image.

2. The method of claim 1 wherein the scaling provides for converting a range of rotation corresponding to the pilot's head from a straight ahead position to a position where the pilot's eyes will remain fixed on the at least one flight display to a change in the updated heading of 180 degrees.

3. The method of claim 2 wherein the scaling provides for a rotation of the pilot's head of less than 40 degrees that yields a change in the updated heading of at least 180 degrees.

4. The method of claim 3 wherein the scaling is non-linear.

5. The method of claim 4 wherein the scaling increases as the rotation of the pilot's head increases.

6. A method of operating an aircraft comprising a cockpit with a flight deck having at least one flight display, a pilot's seat facing the flight deck, and a synthetic vision system producing a synthetic image for displaying on the at least one flight display, the method comprising:
   determining a location and heading of the aircraft;
   retrieving a synthetic vision image from the synthetic vision system according to the determined location and heading;
   displaying on the at least one flight display the synthetic vision image;
   receiving a viewing change input from the pilot requesting a change in the heading for the synthetic vision image being displayed;
   in response to the viewing change input, tracking movement of the pilot's head for the pilot sitting in the seat including tracking side-to-side head movement and tracking up and down head movement to determine a pitch;
   determining an updated heading based on the tracked head movement including based on both the determined heading and pitch and scaling the tracked head movement;
   retrieving an updated synthetic vision image from the synthetic vision system according to the updated heading; and
   displaying on the at least one flight display the updated synthetic vision image.

7. The method of claim 6 wherein the scaling provides for converting a range of rotation corresponding to the pilot's head from a straight ahead position to a position where the pilot's eyes will remain fixed on the at least one flight display to a change in the updated heading of 180 degrees.

8. The method of claim 7 wherein the scaling provides for a rotation of the pilot's head of less than 40 degrees that results in a heading change of at least 180 degrees.

9. The method of claim 7 wherein the scaling is non-linear.

10. The method of claim 9 wherein the scaling increases as the rotation of the pilot's head increases.

* * * * *